US008418364B2

(12) United States Patent
McDowell et al.

(10) Patent No.: US 8,418,364 B2
(45) Date of Patent: Apr. 16, 2013

(54) METHOD OF EXTENDING TUBING LIFE OF A PERISTALTIC PUMP

(75) Inventors: William M. McDowell, Garden Grove, CA (US); John Nguyen, Yorba Linda, CA (US); Robert E. Gledhill, Huntington Beach, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 986 days.

(21) Appl. No.: 12/400,637

(22) Filed: Mar. 9, 2009

(65) Prior Publication Data

US 2010/0008755 A1 Jan. 14, 2010

Related U.S. Application Data

(60) Provisional application No. 61/080,642, filed on Jul. 14, 2008.

(51) Int. Cl.
*B23P 6/00* (2006.01)

(52) U.S. Cl.
USPC ............... 29/888.021; 29/888.022; 417/477.1

(58) Field of Classification Search ............... 29/888.02, 29/888.021, 888.022; 417/476, 477, 477.1, 417/477.7
See application file for complete search history.

(56) References Cited

U.S. PATENT DOCUMENTS

| | | | | |
|---|---|---|---|---|
| 2,123,781 | A | | 7/1938 | Huber |
| 4,231,725 | A | | 11/1980 | Hogan |
| 4,341,002 | A | | 7/1982 | Diba |
| 4,518,327 | A | | 5/1985 | Hackman |
| 4,527,323 | A | | 7/1985 | Dawson |
| 4,558,996 | A | | 12/1985 | Becker |
| 4,576,553 | A | * | 3/1986 | Winston et al. ................... 417/9 |
| 4,673,334 | A | | 6/1987 | Allington et al. |
| 4,925,376 | A | | 5/1990 | Kahler |
| 5,049,048 | A | * | 9/1991 | Streicher ................. 417/477.12 |
| 5,190,448 | A | | 3/1993 | Lane et al. |
| 5,201,711 | A | | 4/1993 | Pasqualucci et al. |
| 5,267,956 | A | | 12/1993 | Beuchat |
| 5,356,267 | A | * | 10/1994 | Fulmer ........................... 417/53 |
| 5,370,510 | A | | 12/1994 | Sinclair et al. |
| 5,375,309 | A | | 12/1994 | Dunn |
| 5,387,088 | A | | 2/1995 | Knapp et al. |
| 5,388,972 | A | | 2/1995 | Calhoun et al. |
| 5,484,239 | A | | 1/1996 | Chapman et al. |
| 5,588,815 | A | | 12/1996 | Zaleski, II |
| 5,871,341 | A | | 2/1999 | Melody |
| 5,915,932 | A | | 6/1999 | Nabity et al. |
| 6,203,295 | B1 | | 3/2001 | Nishioka |
| 6,213,739 | B1 | | 4/2001 | Phallen et al. |
| 6,523,862 | B1 | | 2/2003 | MacDuff |
| 6,658,711 | B1 | | 12/2003 | Benson |
| 6,695,807 | B2 | | 2/2004 | Bell et al. |
| 6,731,216 | B2 | | 5/2004 | Ho et al. |
| 7,275,293 | B2 | | 10/2007 | Wathey |

(Continued)

*Primary Examiner* — David Bryant
*Assistant Examiner* — Ryan J Walters
(74) *Attorney, Agent, or Firm* — Knobbe, Martens, Olson & Bear LLP

(57) ABSTRACT

A method is provided for extending useful life of tubing of a peristaltic pump. The method can comprise switching inlet and discharge hoses between respective inlet and outlet ends of the tubing of the peristaltic pump, and reversing a direction of rotation of a rotor of the peristaltic pump. In implementations of methods disclosed herein, the useful life of the tubing of a peristaltic pump can be approximately doubled.

10 Claims, 6 Drawing Sheets

U.S. PATENT DOCUMENTS

| | | | |
|---|---|---|---|
| 7,300,264 | B2 | 11/2007 | Souza |
| 7,347,457 | B2 | 3/2008 | Wulf et al. |
| 7,434,312 | B2 | 10/2008 | Christensen et al. |
| 2004/0179907 | A1 | 9/2004 | MacDuff |
| 2005/0085699 | A1 | 4/2005 | Weiss |
| 2007/0140880 | A1 | 6/2007 | Fulmer |
| 2008/0101969 | A1 | 5/2008 | Moubayet |
| 2009/0053084 | A1 | 2/2009 | Klein |
| 2009/0158855 | A1 * | 6/2009 | Holden ........................... 73/756 |

* cited by examiner

METHOD OF EXTENDING TUBING LIFE OF A PERISTALTIC PUMP

CROSS-REFERENCE TO RELATED APPLICATIONS

This application claims the benefit of U.S. Provisional Application No. 61/080,642, filed Jul. 14, 2008, the entirety of the disclosure of which is incorporated herein by reference.

BACKGROUND

1. Field of the Inventions

The present inventions relate generally to peristaltic pumps. More particularly, the present inventions relate to methods of replacing pump tubing of a peristaltic pump and extending the useful life of the tubing.

2. Description of the Related Art

A peristaltic roller pump typically has three or more rollers, but may have other configurations. The rollers are spaced circumferentially evenly apart and are mounted on a rotating carrier that moves the rollers in a circle. A length of flexible tubing is placed between the rollers and a semi-circular wall. In medical applications, the tubing can be a relatively soft and pliable rubber tubing. For relatively high pressure industrial applications, however, the tubing can be exceedingly durable and rigid, albeit flexible under the high pressure of the rollers.

In use, the rollers rotate in a circular movement and compress the tubing against the wall, squeezing the fluid through the tubing ahead of the rollers. The rollers are configured to almost completely occlude the tubing, and operate essentially as a positive displacement pump, each passage of a roller through the semicircle pumps the entire volume of the fluid contained in the tubing segment between the rollers.

As a positive displacement pump, relatively high positive pressures (e.g., 125 psi) can be generated at the pump outlet. Peristaltic roller pumps are typically driven by a constant speed motor that draws fluid at a substantially constant rate. Over time, the high pressures at the pump outlet can wear on the tubing and result in the development of small pinholes in the tubing. If unnoticed, the pinholes can grow and eventually result in failure of the tubing.

Ruptured tubing can lead to internal leakage and the cessation of proper function. When the pump is used to move a corrosive chemical, such as chlorine, internal leakage can be particularly hazardous. As the chemical comes into contact with the pump components, the pump may become irreparably damaged. This is a serious shortcoming because the costs associated with replacement of the pump can be very substantial.

When tubing is replaced, the placement of the tubing underneath the rollers of the pump can be a very difficult task, especially in industrial applications. Typically, a user will attempt to replace the tubing by connecting one end of the tubing to one of the inlet or outlet ends of the pump and then forcibly bending the tubing around the rollers of the pump. This task is extremely difficult considering the narrow spacing between the rollers and the pump wall.

SUMMARY

In accordance with an aspect of at least one of the embodiments disclosed herein is the realization that pump tubing life can be extended, if not doubled, by analyzing the causes of failure and stress in the tubing during use. More particularly, an aspect of at least one of the embodiments comprises the realization that although the high pressures at the outlet end of the tubing create significant stresses that can create pinholes at that end of the tubing, the inlet end of the tubing experiences very little stress and upon reversal of the pump and by switching the external hoses coupled to the inlet and outlet ends, the useful life of the tubing can be extended.

Therefore, in an embodiment, a method of extending tubing life is provided in which a given end of the tubing can first be used as an outlet end and before experiencing failure, can be switched such that it is used as an inlet end. Thus, the given end can serve as an outlet end and experience the high pressures and stresses as an outlet end, but then serve as an inlet end which creates minimal stress on the given end. In particular, some embodiments comprise a method in which, without removing or replacing the tubing, the pump can be reversed and the external hoses coupled to the inlet and outlet ends can be switched in order to allow each end of the tubing to serve both as an inlet and an outlet end.

Accordingly, in an embodiment disclosed herein, a method is provided for extending useful life of tubing of a peristaltic pump. The method can comprise the steps of: disconnecting inlet and discharge hoses from respective first and second ends of a tubing assembly of the peristaltic pump; connecting the inlet hose to the second end of the tubing assembly; connecting the discharge hose to the first end of the tubing assembly; and reversing rotation of a rotor of the peristaltic pump from a first rotational direction when the inlet hose was connected to the first end of the tubing assembly to a second rotational direction. As used herein, "connecting" is a broad term. For example, the connection between the hose and the tubing may be either direct or indirect. However, the term is not intended to encompass a connection to one end of the tube using the other end of the tube. Otherwise, there would be a "connection" without disconnecting and reorienting the tube.

In accordance with another embodiment, a method is provided for extending useful life of tubing of a peristaltic pump, the method comprising: disconnecting an inlet channel from a first end of the tubing of the peristaltic pump; disconnecting an outlet channel from a second end of the tubing of the peristaltic pump; connecting the inlet channel to the second end of the tubing; connecting the discharge channel to the first end of the tubing; and reversing rotation of a rotor of the peristaltic pump from a first rotational direction to a second rotational direction, the first rotational direction used while the inlet channel is connected to the first end, the second rotational direction used when the inlet channel is connected to the second end.

In some implementations, the inlet and discharge channels can be hoses. The method can be configured to further comprise identifying usage information of the tubing of the peristaltic pump. In this regard, the step of identifying usage information of the tubing of the peristaltic pump can comprise calculating a first number of revolutions of the rotor of the peristaltic pump against the tubing while rotating in the first rotational direction. Further, the step of identifying usage information of the tubing of the peristaltic pump can further comprise stopping operation of the peristaltic pump when the number of revolutions of the rotor reaches a first predetermined value. In some embodiments, rotation of the rotor of the peristaltic pump can stop automatically.

Additionally, in other embodiments, the step of detecting usage information of the tubing of the peristaltic pump can comprise calculating a second number of revolutions of the rotor of the peristaltic pump against the tubing while rotating in the second rotational direction. In this regard, the step of detecting usage information of the tubing of the peristaltic pump can further comprise stopping operation of the peristaltic pump when the number of revolutions of the rotor reaches a second predetermined value. Furthermore, rotation of the rotor of the peristaltic pump can stop automatically. In yet another implementations of the method, the tubing of the peristaltic pump may not be removed from the peristaltic pump.

In another embodiment, a method is provided for extending useful life of tubing of a peristaltic pump. The method can comprise switching inlet and discharge channels between respective inlet and outlet ends of the tubing of the peristaltic pump, and reversing a direction of rotation of a rotor of the peristaltic pump.

In some embodiments, the inlet and discharge channels can be hoses. Further, the method can further comprise identifying usage information of the tubing of the peristaltic pump. The step of identifying usage information of the tubing of the peristaltic pump can comprise calculating a first number of revolutions of the rotor of the peristaltic pump against the tubing while rotating in the first rotational direction. Further, the step of identifying usage information of the tubing of the peristaltic pump further can comprise stopping operation of the peristaltic pump when the number of revolutions of the rotor reaches a first predetermined value.

In addition, the step of detecting usage information of the tubing of the peristaltic pump can comprise calculating a second number of revolutions of the rotor of the peristaltic pump against the tubing while rotating in the second rotational direction. Further, the step of detecting usage information of the tubing of the peristaltic pump further can comprise stopping operation of the peristaltic pump when the number of revolutions of the rotor exceeds a second predetermined value.

Further, rotation of the rotor of the peristaltic pump can stop automatically. Furthermore, the tubing of the peristaltic pump may not not removed from the peristaltic pump.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENTS

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Figure 1:
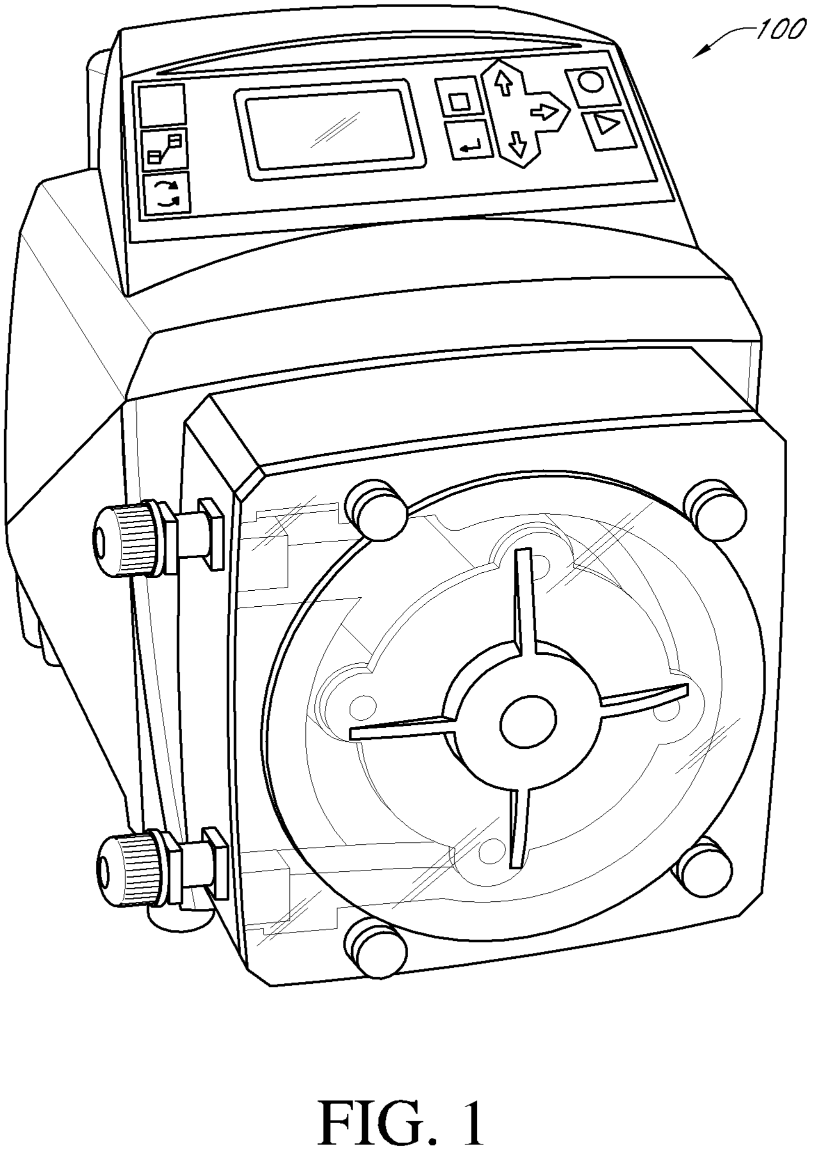
FIG. 1 is a perspective view of a peristaltic pump, according to an embodiment of the present inventions.
Figure 2:
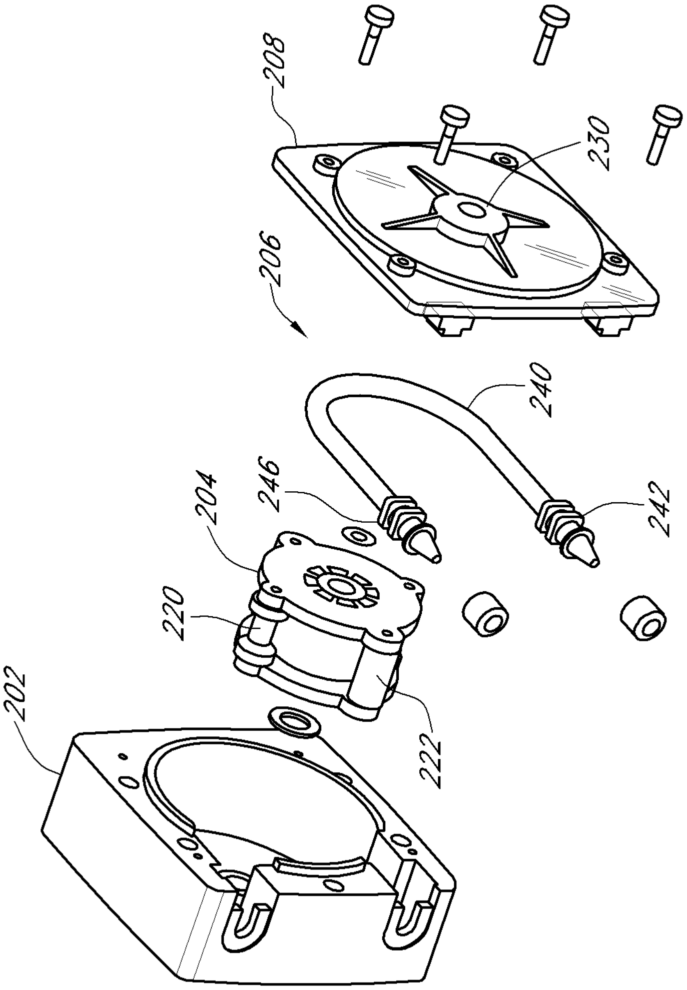
FIG. 2 is an exploded perspective view of components of a peristaltic pump, in accordance with an embodiment.

FIG. 1 is a perspective view of a peristaltic pump 100, according to an embodiment of the present inventions, and FIG. 2 is an exploded perspective view of components of a peristaltic pump, in accordance with an embodiment. As illustrated, the peristaltic pump can comprise a pump housing or head 202, a rotor 204 that rotates within a cavity of the pump head, a tube or tubing assembly 206, and a pump head cover 208 that encloses the rotor 204 and the tubing assembly 206 within the cavity of the pump head 202. The pump housing or head 202 can be formed such that the tubing assembly 206 is positioned in a loop. However, in some embodiments, the pump housing or head 202 can be formed such that the tubing assembly 206 passes in a straight line through the pump housing or head 202. In other words, the pump housing or head 202 can be configured such that the inlet or outlet ports formed therein provide for a loop or straight-line arrangement of the tubing assembly 206 when installed therein.

The tubing assembly 206 can comprise a tube 240 having connectors 242, 244 that are disposed at the opposing ends of the tube 240. It is contemplated that the connectors 242, 244 may be modified and even omitted in some embodiments. The rotor 204 can comprise a plurality of rollers that compress a tube of the tubing assembly within the pump head in order to force fluid through the tube. The rotor can rotate in a clockwise or counterclockwise direction. As will be appreciated, fluid in the tube can be urged within the tube along the direction of travel of the rollers.

As shown in FIG. 2, the rollers can comprise at least one alignment roller 220 and at least one compression roller 222. The alignment roller 220 can be formed to comprise a smaller diameter in a central portion thereof and a larger diameter along sides of the roller 220. In this manner, the roller 220 can be configured to maintain the tube within a gap between the rollers and a wall of the pump head. The unique shape of the roller 220 allows the tube to be urged toward a center of the roller by side edges thereof.

In some embodiments, the compression roller 222 can be configured to compress or pinch the tube 240 against an interior surface of the pump head 202 as the roller 222 rotates within the pump head 202. The compression or pinching of the tube 240 occurs along a length of the tube as the compression roller 222 rotates. The movement and compression urges material disposed within the tube 240 to move through the tube 240 in the direction of rotation of the roller 222. Thus, the compression roller 222 can serve to urge fluid or other material through the tube 240 in the direction of the roller's rotation. In use, an industrial peristaltic pump may operate such that the ends of the tube are subjected to at high pressures. Additionally, such pumps can also be employed in pumping harmful chemicals.

In prior art peristaltic pumps, the rotor moves at about 125 rpm (if turned "on") or not at all (if turned "off"). However, in order to replace the tubing assembly, one must thread the tubing under the rollers of the rotor. Typically, this is attempted in the "off" mode, when the rotor is not moving at all, and the threading of the tubing is extremely difficult. In an embodiment, it is contemplated that although tubing replacement is easier if the rotor is moving in the "on" mode, serious injury can occur with the rotor moving at about 125 rpm.

Accordingly, in an embodiment, the peristaltic pump can comprise a safety switch mechanism that causes a peristaltic pump to slow down during use for a given reason. For example, the mechanism can be configured such that removal of the head cover can cause the peristaltic pump to slow down for maintenance purposes. Thus, an operator may be able to remove the head cover and thread the tubing under slower-moving rollers of the rotor without the danger of a fast-moving rotor. In this regard, other embodiments of a safety switch mechanism are disclosed in applicant's copending patent application, U.S. patent application Ser. No. 12/400,639, filed on Mar. 9, 2009, entitled SAFETY SWITCH ON A PERISTALTIC PUMP, the entirety of the disclosure of which is incorporated herein by reference.

More specifically, the peristaltic pump can comprise a maintenance mode that is triggered when a head cover is removed. The head cover can comprise a first sensor component that is disposed adjacent to the pump when the head cover is properly fitted onto the pump and is disposed away from the pump when the head cover is removed from the pump. The pump can also comprise a second sensor component that is operative to detect whether the first sensor component is disposed adjacent to the pump. Further, the second sensor component can be in electrical communication with the pump in order to affect an operational or functional characteristic of the pump. In some embodiments, the second sensor component can trigger a reduction in the rotational speed of the rotor.

For example, the head cover can comprise a magnet and when the head cover is removed, the sensor can detect the absence of the magnet and can trigger the maintenance mode, or slowdown of the rotor. Once absence of the head cover is detected, the rotor of the peristaltic pump can slow from 125 rpm to 6 rpm. It is contemplated that the sensor can be used to trigger other changes in the operation of the pump, such as stopping operation of the pump or simply reducing the rotational speed of the rotor.

In addition, as shown in FIG. 2, some embodiments of the pump can be configured such that the head cover of the peristaltic pump comprises an axle support portion 230. The axle support portion can be configured to provide support for an end of an axle of the rotor. As such, and axle can be disposed through the pump head, pass through a core or central portion of the rotor, and be supported by the axle support portion of the head cover. In such an embodiment, when the head cover is mounted on the pump head, it can support an end of the rotor axle which contributes to the longevity and durability of the peristaltic pump.

Figure 3A:
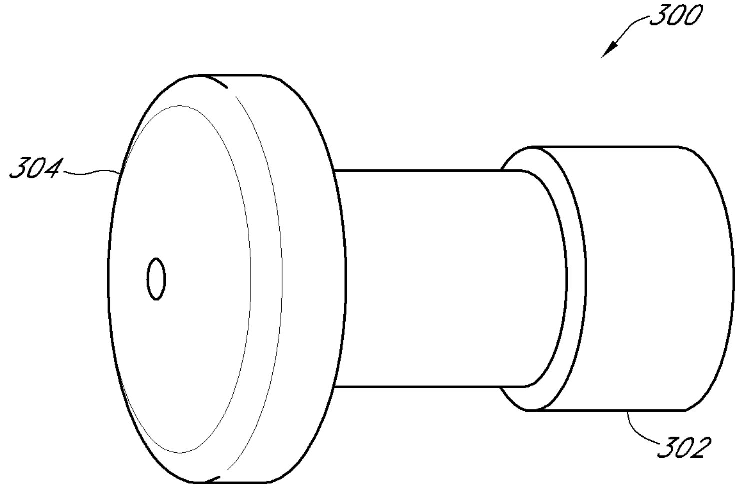
FIG. 3A is a perspective view of a tubing installation tool, according to an embodiment.
Figure 3B:
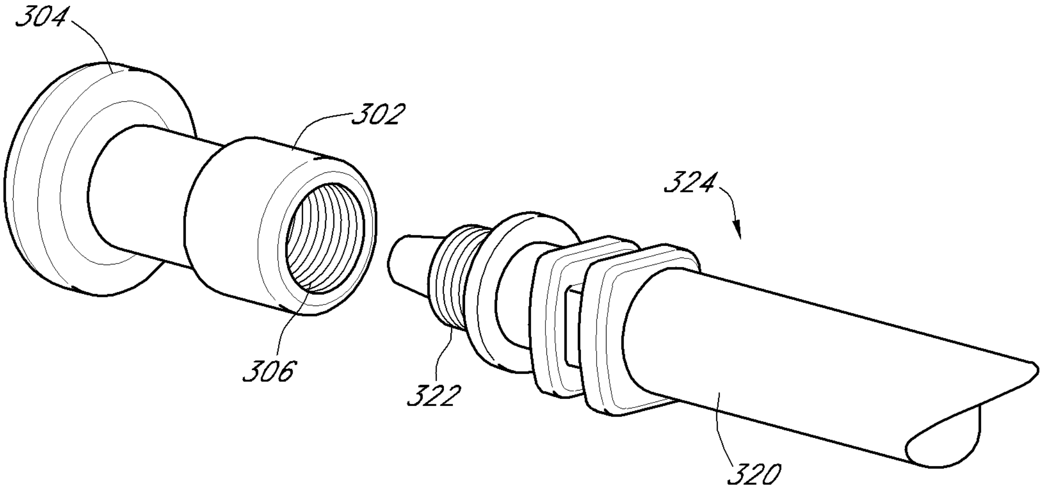
FIG. 3B is a perspective end view of the tubing installation tool of FIG. 3A being attached to a tubing assembly.

Referring now to FIGS. 3A-B, an embodiment and uses of a tubing installation tool are illustrated. As will be appreciated, the tubing installation tool can be configured to comprise various features and components that facilitate interconnection of the tool with a connector and/or end of a tubing assembly. Further, the tool can also comprise an engagement portion that can be easily grasped by an operator such that the operator is enabled to transfer a pushing, pulling, or other manipulating force to the tubing assembly. In this regard, other embodiments of a tubing installation tool are disclosed in applicant's copending patent application, U.S. patent application Ser. No. 12/421,578, filed on Apr. 9, 2009, entitled TUBING INSTALLATION TOOL FOR A PERISTALTIC PUMP AND METHODS OF USE, the entirety of the disclosure of which is incorporated herein by reference.

FIG. 3A is a perspective view of a tubing installation tool 300, according to an embodiment. The tool 300 can include an engagement portion 302 and a handle portion 304. FIG. 3B illustrates that in some embodiments, the engagement portion 302 can be formed to comprise a plurality of internal threads 306 along an interior portion thereof. FIG. 3B also illustrates that the threads 306 of the tool 300 can be used to threadably attach the tool 300 to an end 320 of a tube or to a connector 322 of a tubing assembly 324. In this manner, it is contemplated that the tool 300 can be securely attached to the end 320 of the tube or connector 322 of the tubing assembly 324. Thus, an operator can attach the tool 300 to the tubing assembly 324 and grasp the handle portion 304 of the tool 300 in order to guide an end 320 of the tube or tubing assembly 324 during removal or installation of the tube or tubing assembly 324 with respect to the pump.

As noted above, prior art methods indicate that in order to replace the tubing assembly, one must thread the tubing under the rollers of the rotor while the pump is turned "off." This can be an extremely difficult process depending on the application of the peristaltic pump. For example, industrial tubing for a peristaltic pump is extremely durable, less pliable than other types of tubing (such as medical tubing), and quite rigid. As a result, it is very difficult to manually thread industrial tubing under the rollers of the rotor. Indeed, the tubing is difficult to physically bend or deform by hand. Therefore, replacing tubing can be an extraordinarily difficult task. However, through the use of embodiments of the tool disclosed herein, the removal or installation process of such tubing can be greatly facilitated.

Figure 4A:
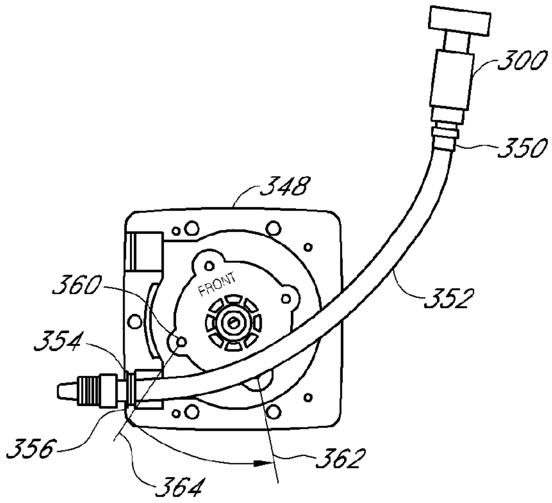
FIGS. 4A-D illustrate steps of a method of installing tubing in a peristaltic pump, according to an embodiment.

FIGS. 4A-D illustrate steps of a method of installing tubing in a peristaltic pump, according to an embodiment. As shown in FIG. 4A, the tubing installation tool 300 can first be attached to a first end 350 of the tubing 352. A second and 354 of the tubing can be placed into a first port 356 of the pump. As shown from FIGS. 4A-B, an alignment or centering roller 360 should be rotated to an initial position denoted by the line 362 in FIG. 4A. It is possible that the centering roller 360 needs to be rotated from some other position (such as that denoted by the line 364) in order to be in an appropriate initial position. As will be appreciated by one skill in the art, the initial position of the centering roller 360 need not be a precise or exact rotational position, but should merely allow the centering roller 360 to be generally aligned with a portion of the tubing extending from the first port of the pump.

Figure 4B:
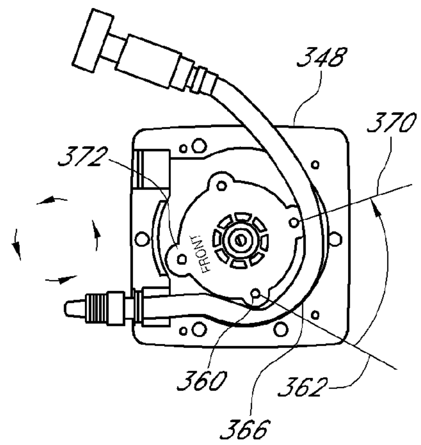

Referring now to FIG. 4B, with the centering roller 360 in place, a portion of the tubing can be urged in to the gap between the centering roller and a wall of the cavity of the pump head. Once inserted into the gap, the tubing can generally be retained within the gap by the action of the centering roller. As such, the rotor can then be rotated such that the centering roller 360 moves from the initial position denoted by the line 362 to a second position denoted by the line 370. During this rotation, the operator can use the tool to urge additional portions of the tubing into the gap. The tool provides the operator with significant leverage and control over the first end of the tubing as the operator exerts great force on the tubing to push the tubing into the gap ahead of the rotating centering roller 360. In this manner, upon rotation of the centering roller 360, additional portions of the tubing are received within the gap. Additionally, a compressive roller 372 follows the centering roller and begins to exert a compressive force against the tubing in order to pinch the tubing.

Figure 4C:
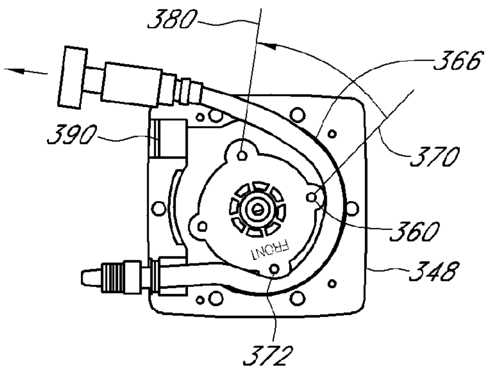

Next, as shown in FIG. 4C, the centering roller 360 moves from the second position denoted by the line 370 towards a third position denoted by the line 380. As discussed above, the operator continues to use the tool to urge the tubing into the gap ahead of the centering roller 360. During this portion of the operation, the leverage and control provided by the tool become extremely important to the operator. In particular, the operator must aggressively stretch and pull the tubing in order to ensure that the tubing becomes aligned with a second port 390 of the pump. As the rotor continues to rotate, the operator can urge the tubing into the gap and the centering roller 360 draws the tubing into alignment with the rollers of the rotor.

Figure 4D:
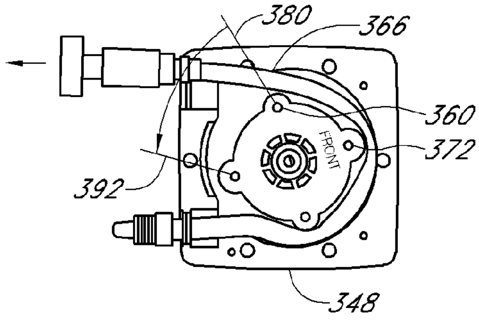

As illustrated in FIG. 4D, the centering roller 360 can move from the third position denoted by the line 380 to a fourth position denoted by the line 392. Once the tubing is fully received in to the gap, the first end of the tubing assembly can be placed in to the second port of the pump. The operator then ensures that both ends of the tubing are securely fastens into the ports of the pump. The alignment and placement of the tubing will then resemble that illustrated in FIGS. 6A-B.

Accordingly, the tool provides an operator with the necessary leverage to aggressively pull and bend the tubing during replacement of the tubing. These same advantages can be achieved whether installing or removing the tubing from the pump.

Figure 5:
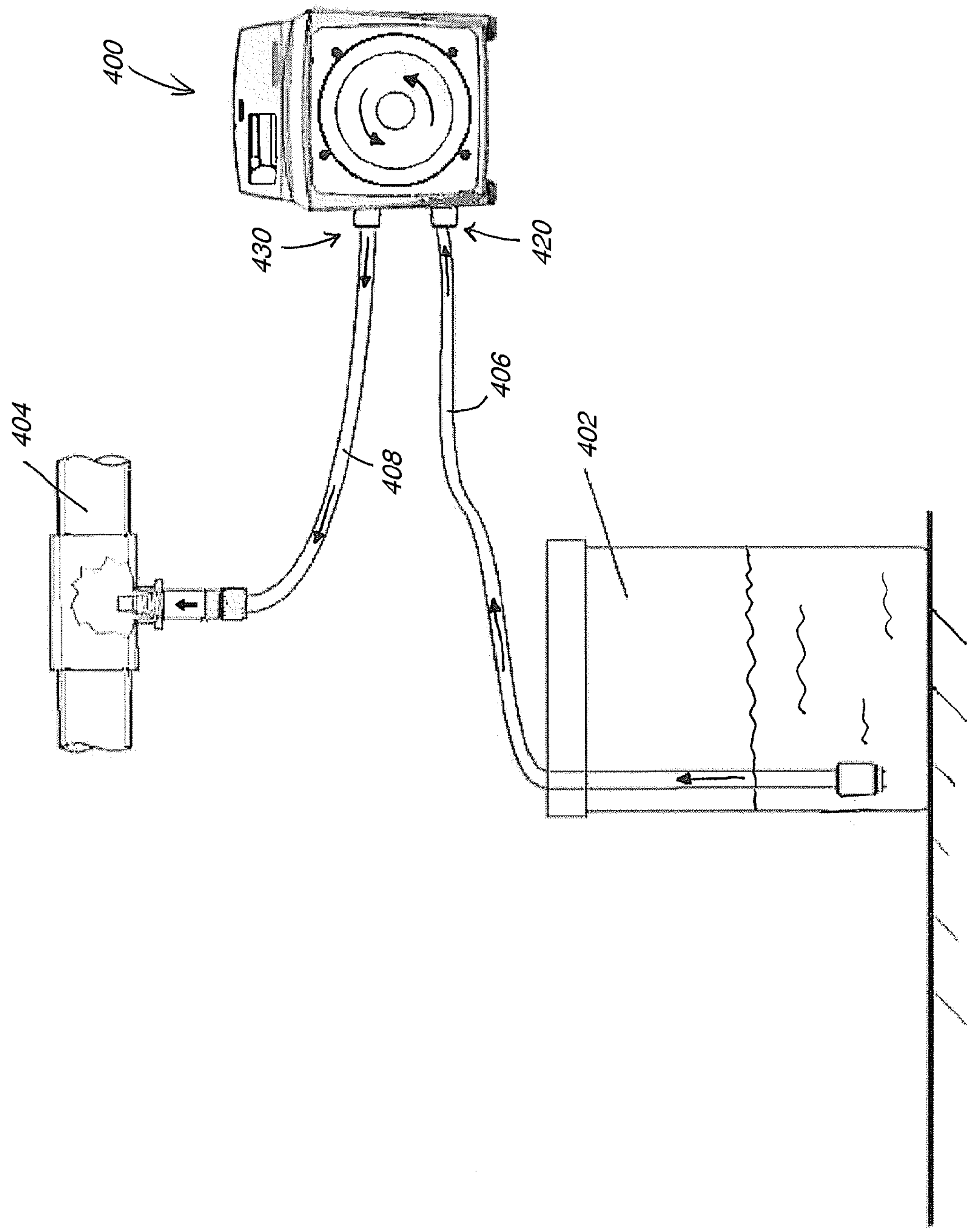
FIG. 5 is a view of a system in which a peristaltic pump is operative to remove fluid from a source container and deliver it to a target container.

FIG. 5 is a view of a system in which a peristaltic pump 400 is operative to remove fluid from a source container 402 and deliver it to a target container 404. In this regard, the peristaltic pump can be attached to an inlet or suction hose 406 and a discharge hose 408. As shown in FIG. 5, in order to achieve fluid flow from the source container to the target container, a rotor of the peristaltic pump must rotate in a counterclockwise direction.

According to at least one of the embodiments disclosed herein is the realization that the fluid pressure at an inlet 420 of the peristaltic pump is much less then the fluid pressure at an outlet 430 of the pump. As a result, the high pressure at the outlet or discharge end of the tubing of the peristaltic pump causes that end of the tubing to experience significant stress such that small pinholes in the tubing develop, which eventually result in leakage and failure of the tubing. Any breaks or pinholes in the tubing can quickly cause failure of the tubing, especially considering the high pressures at which the peristaltic pump operates (125 psi). Therefore, in accordance with some embodiments, a method is provided for manipulating the operation of the pump and the system in order to extend the useful life of the tubing of the pump.

Figure 6A:
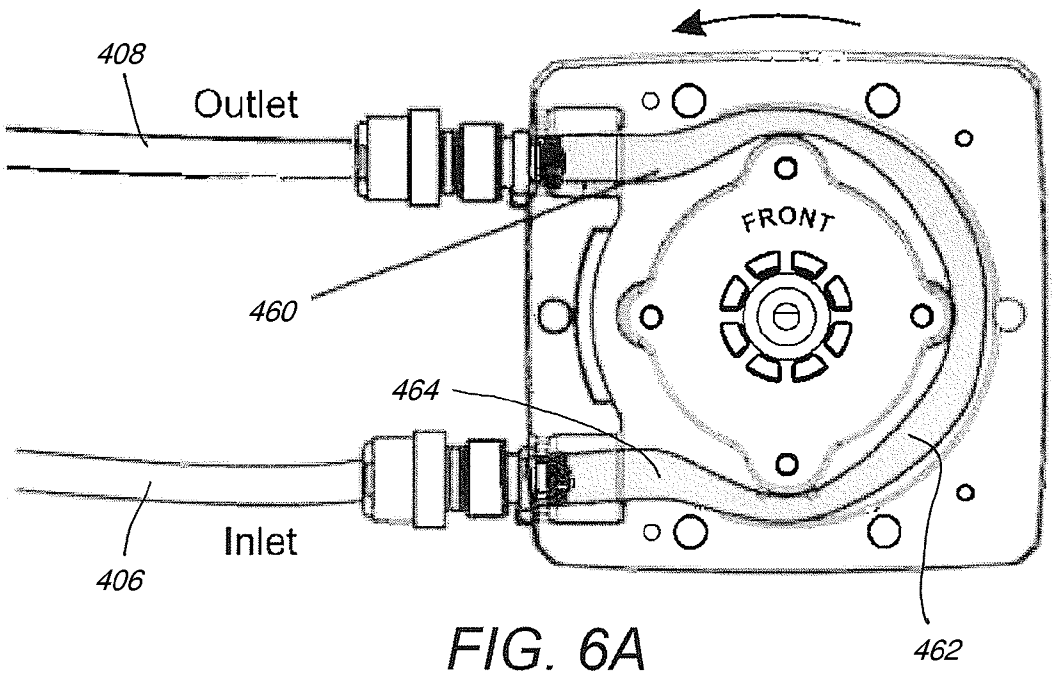
FIGS. 6A-B illustrate steps of a method of extending useful life of tubing in a peristaltic pump, according to an embodiment.
Figure 6B:
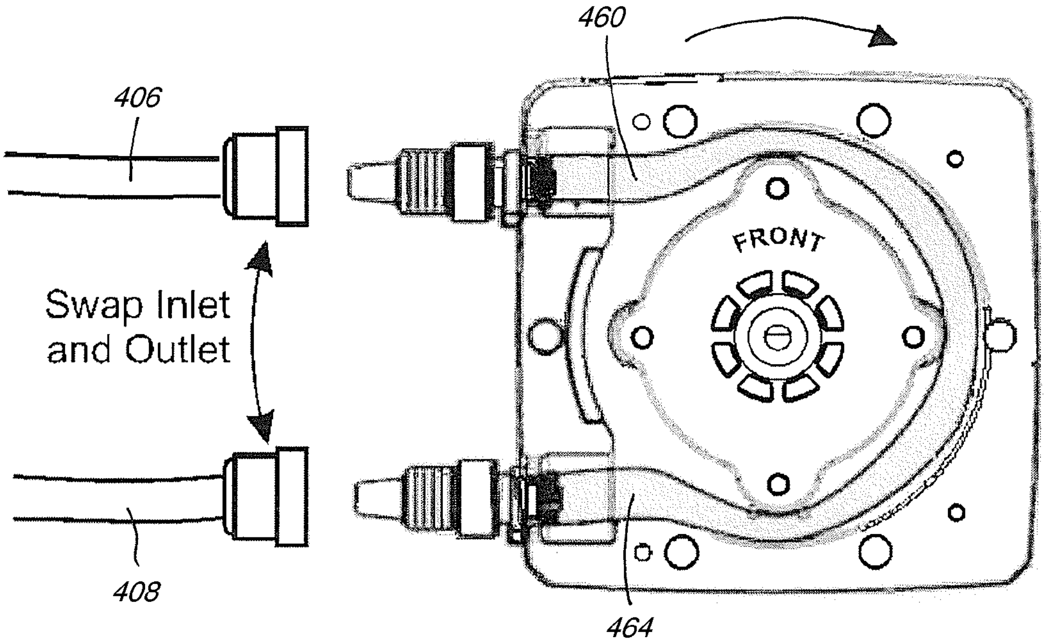

FIGS. 6A-B illustrate steps of a method of extending useful life of tubing in a peristaltic pump, according to an embodiment. As illustrated in FIG. 6A, which is an enlarged view of the pump shown in the system of FIG. 5, the rotor of the pump moves in a counterclockwise direction. Thus, as discussed above, the fluid pressure at the outlet is much higher than at the inlet. Specifically, the fluid pressure at a first end 460 of tubing 462 is much higher than the fluid pressure at a second end 464 of the tubing.

In accordance with an embodiment, a method of extending tubing life of a peristaltic pump comprises (1) switching the inlet and discharge hoses 406, 408 between the first and second ends 460, 464 of the tubing 462 and (2) reversing the rotational direction of the pump. Accordingly, as shown in FIG. 6B, the inlet and discharge hoses 406, 408 are disconnected from the respective first and second ends 460, 464 of the tubing 462. Next, the inlet hose 406 is attached to the first end 460 of the tubing 462. Similarly, the discharge hose 408 is attached to the second end 464 of the tubing 462. In such an embodiment, the tubing assembly of the peristaltic pump need not be removed from the pump, but instead remains disposed in the pump as initially installed. Finally, the direction of rotation of the rotor of the pump can be reversed, thus changing the direction of fluid flow through the pump.

In this manner, each end of the tubing assembly of the pump is able to act as both an inlet and an outlet end, experiencing the high fluid pressures attendant with operation as an outlet and in the low fluid pressures attendant with operation as an inlet end. If such a modification to the system is performed before significant damage occurs to the first end of the tubing, the useful life of the tubing can be significantly extended.

In particular, although the first end 408 of the tubing 462 experienced significant stress by serving initially as the outlet end, the first end 408 will experience very little stress by serving secondarily as the inlet end. As such, it is possible that the first end 408 could operate indefinitely as an inlet end. Indeed, once the system has been modified in accordance with an embodiment of the method described herein, the useful life of the tubing will depend on the amount of time that the second end 406 of the tubing 462 is able to serve as an outlet or discharge end. Although the second end 406 initially served as an inlet end and therefore experienced very little stress, after modification, the second end 406 will serve as the discharge end and will be subject to significant stress. Thus, when the second end 406 begins to develop pinholes and reach the end of its useful life, the tubing assembly will need to be replaced. However, through the implementation of such a modification to the system, the useful life of the tubing 462 can approximately be doubled.

In addition, in some embodiments, the modification to this system can be carried out before the first end of the tubing shows any signs of significant wear. It is contemplated that a given type of tubing can be analyzed in order to determine the period of time or the number of cycles for which the tubing can be used with fluid flow in a given direction before the system would need to be modified through implementing such a method as disclosed herein. Indeed, after a certain amount of experience in a given environment, this failure time period can be estimated fairly accurately. Accordingly, in some embodiments, a timer can be used to alert the operator when the maintenance procedures must be taken (such as switching the hoses and reversing the rotational direction of the rotor). Such a timer can provide information about only as to when the system should be modified, but also when the tubing should be replaced.

It is contemplated that embodiments of the method discussed above can be implemented in various types of peristaltic pumps that require high pressures at the outlet end of the tubing. However, it is also contemplated that such a method may be beneficially implemented for other types of systems in order to allow the tubing to wear in a more uniform manner, which may similarly extend the life of the tubing.

According to various embodiments, implementation of the method discussed above can also result in cost and time savings. Clearly, by extending the life of the tubing, replacement costs are substantially decreased. However, implementing such a method can also save production and replacement time that would otherwise be sacrificed in maintaining the system.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A method for extending useful life of tubing of a high pressure peristaltic pump without removing the tubing, the method comprising:

disconnecting an inlet channel extending outside of the pump from a first connector secured to a first end of the tubing of the peristaltic pump and mounted within a first port formed in a pump housing;

disconnecting an outlet channel extending outside of the pump from a second connector secured to a second end of the tubing of the peristaltic pump and mounted within a second port formed in a pump housing;

connecting the inlet channel to the second end of the tubing of the peristaltic pump and connecting the outlet channel to the first end of the tubing, wherein the connecting of the inlet channel to the second end of the tubing of the peristaltic pump and the connecting of the outlet channel to the first end of the tubing is performed (1) without disconnecting the first connector from the first end of the tubing of the peristaltic pump, (2) without unmounting the first connector from within the first port of the pump housing, (3) without disconnecting the second connector from the first end of the tubing of the peristaltic pump and (4) without unmounting the first connector from within the first port of the pump housing;

reversing rotation of a rotor of the peristaltic pump from a first rotational direction to a second rotational direction, the first rotational direction used while the inlet channel is connected to the first end such that rotation of the rotor of the peristaltic pump compresses the tubing along its length from the first end to the second end, the second rotational direction used when the inlet channel is connected to the second end such that rotation of the rotor of the peristaltic pump compresses the tubing along its length from the second end to the first end.

2. The method of claim 1, wherein the inlet and outlet channels are hoses.

3. The method of claim 1, further comprising identifying usage information of the tubing of the peristaltic pump.

4. The method of claim 3, wherein identifying usage information of the tubing of the peristaltic pump comprises calculating a first number of revolutions of the rotor of the peristaltic pump against the tubing while rotating in the first rotational direction.

5. The method of claim 3, wherein identifying usage information of the tubing of the peristaltic pump further comprises stopping operation of the peristaltic pump when the number of revolutions of the rotor reaches a first predetermined value.

6. The method of claim 4, wherein rotation of the rotor of the peristaltic pump stops automatically.

7. The method of claim 3, wherein identifying usage information of the tubing of the peristaltic pump comprises calculating a second number of revolutions of the rotor of the peristaltic pump against the tubing while rotating in the second rotational direction.

8. The method of claim 6, wherein identifying usage information of the tubing of the peristaltic pump further comprises stopping operation of the peristaltic pump when the number of revolutions of the rotor reaches a second predetermined value.

9. The method of claim 7, wherein rotation of the rotor of the peristaltic pump stops automatically.

10. The method of claim 1, wherein the tubing of the peristaltic pump is not removed from the peristaltic pump.

* * * * *